United States Patent
Suzuki et al.

[11] Patent Number: 5,234,043
[45] Date of Patent: Aug. 10, 1993

[54] RADIAL TIRE FOR MOTORCYCLE INCLUDING BEAD APEX EXTENDED BETWEEN BELT AND CARCASS

[75] Inventors: Shigehiko Suzuki, Amagasaki; Eiji Nakasaki, Kakogawa, both of Japan

[73] Assignee: Sumitomo Rubber Industries, Ltd., Kobe, Japan

[21] Appl. No.: 692,997

[22] Filed: Apr. 29, 1991

[30] Foreign Application Priority Data

May 7, 1990 [JP] Japan .................. 2-117937

[51] Int. Cl.$^5$ .................. B60C 9/22; B60C 15/06
[52] U.S. Cl. .................. 152/527; 152/530; 152/533; 152/546; 152/554; 152/555
[58] Field of Search ............. 152/454, 546, 555, 530, 152/531, 533, 455, 534, 526, 541, 554, 557, 517

[56] References Cited

U.S. PATENT DOCUMENTS

| | | | |
|---|---|---|---|
| 3,254,693 | 6/1966 | Travers | 152/534 X |
| 3,500,890 | 3/1970 | Boileau | 152/526 X |
| 4,263,955 | 4/1981 | Ikeda | 152/546 X |
| 4,773,462 | 9/1988 | Ohkuni et al. | 152/531 X |
| 4,832,102 | 5/1989 | Domchick | 152/527 |
| 4,986,326 | 1/1991 | Watkins et al. | 152/555 X |
| 5,176,770 | 1/1993 | Ohkuni | 152/530 |

FOREIGN PATENT DOCUMENTS

| | | | |
|---|---|---|---|
| 0422881 | 4/1991 | European Pat. Off. | 152/533 |
| 58-71205 | 4/1983 | Japan | 152/555 |
| 58-160805 | 9/1983 | Japan . | |
| 58-174004 | 10/1983 | Japan | 152/517 |
| WO87/05865 | 10/1987 | PCT Int'l Appl. | 152/555 |
| 1487426 | 9/1977 | United Kingdom | 152/531 |

*Primary Examiner*—Michael W. Ball
*Assistant Examiner*—Adrienne C. Johnstone

[57] ABSTRACT

A radial tire for motorcycles which comprises: at least one carcass ply of organic fiber cords arranged radially at an angle of 85 to 90 degrees to the tire equator and turned up around the bead cores to form two turned up portions and a main portion therebetween; a tread disposed radially outside the carcass and curved so that the maximum cross section width of the tire lies between the tread edges; a belt disposed radially outside the carcass and inside the tread and having at least one spirally wound cord; and a bead apex disposed between the carcass main portion and each carcass turned up portion, wherein the belt is composed of at least one spirally wound cord having an elastic modulus of not less than 600 kgf/sq.mm; the bead apex is made of rubber having a JIS A hardness of 50 to 65 and extending radially outwardly from the bead core into the tread portion so that the extended portion is interposed between the belt and the carcass; the axial distance of the radially outer edge of the bead apex from the tire equator being greater than zero but less than ¼ times the axial tread width; each carcass turned up portion extending radially outwardly from the bead portion into the tread portion over the tread edge; and the radial height of the radially outer edge of the turned up portion being larger than the radial height of the tread edge, both being measured from the bead base.

4 Claims, 3 Drawing Sheets

RADIAL TIRE FOR MOTORCYCLE INCLUDING BEAD APEX EXTENDED BETWEEN BELT AND CARCASS

The present invention relates to a motorcycle radial tire having a spiral cord belt, in which stability during high speed cornering and high speed straight running is improved.

BACKGROUND OF THE INVENTION

Recently, a radial ply carcass has been used for motorcycle tires. Such a motorcycle radial tire has been made based on technique for four-wheeled vehicle tires, e.g. passenger car tires. That is, the tire has been provided with a belt reinforcement formed as follows: a rubberized fabric (d) is cut bias at a small angle (alpha) to the cord direction as shown in FIG. 6, which is usually 15 to 30 degrees; and the cut fabric (e) is wound around a carcass with connecting the ends (f) as shown in FIG. 5 to form an annular belt reinforcement (a), and accordingly, the laid angle of the belt cords (b) to the tire equator becomes the same bias angle (alpha). In such a bias belt structure, however, steering stability during straight running and cornering, especially at high speed, is not good.

On the other hand, Japanese Utility-Model Publication No. 58-160805 discloses a belt making method, in which a belt cord is wound spirally at a generally zero angle to the circumferential direction of the tire to form a jointless belt. When this is used in the motorcycle tire instead of the conventional belt, stability during high speed straight running is improved, but road grip during cornering is deteriorated.

SUMMARY OF THE INVENTION

It is therefore, an object of the present invention to provide a motorcycle radial tire, in which the cornering power during cornering is increased to improve road grip, and at the same time the cornering power during straight running is decreased to increase the initial speed of weave phenomenon thereby further improving straight running performance.

According to one aspect of the present invention a radial tire for motorcycles comprises:

a pair of bead cores disposed one in each bead portion of the tire;

a carcass extending between the bead portions and having at least one ply of organic fiber cords arranged radially at an angle of 85 to 90 degrees to the tire equator and turned up around the bead cores to form two turned up portions and a main portion therebetween;

a tread disposed radially outside the carcass and curved so that the maximum cross section width of the tire is lying between tread edges;

a belt disposed radially outside the carcass and inside the tread and having at least one spirally wound cord; and a bead apex disposed between the carcass main portion and each carcass turned up portion, said belt composed of at least one spirally wound cord having an elastic modulus of not less than 600 kgf/sq.mm, and formed by winding spirally a ribbon of rubber in which said at least one cord is embedded, said bead apex made of rubber having a JIS A hardness of 50 to 65 and extending radially outwardly from the bead core into the tread portion so that the extended portion is interposed between the belt and the carcass, the axial distance of the radially outer edge of the bead apex from the tire equator being less than $\frac{1}{4}$ times the axial tread width, each carcass turned up portion extending radially outwardly from the bead portion into the tread portion over the tread edge, and the radial height of the radially outer edge of the turned up portion being larger than the radial height of the tread edge, both measured from the bead base.

Preferably, the radially outer edge of each turned up portion is sandwiched between a belt edge portion and the bead apex, and the belt cord is made of aromatic polyamide fibers, and the belt cord twist is 20×20 to 57×57 turns/10 cm.

BRIEF DESCRIPTION OF THE DRAWINGS

An embodiment of the present invention will now be described in detail with reference to the accompanying drawings, in which.

DETAILED DESCRIPTION OF THE INVENTION

Figure 1:
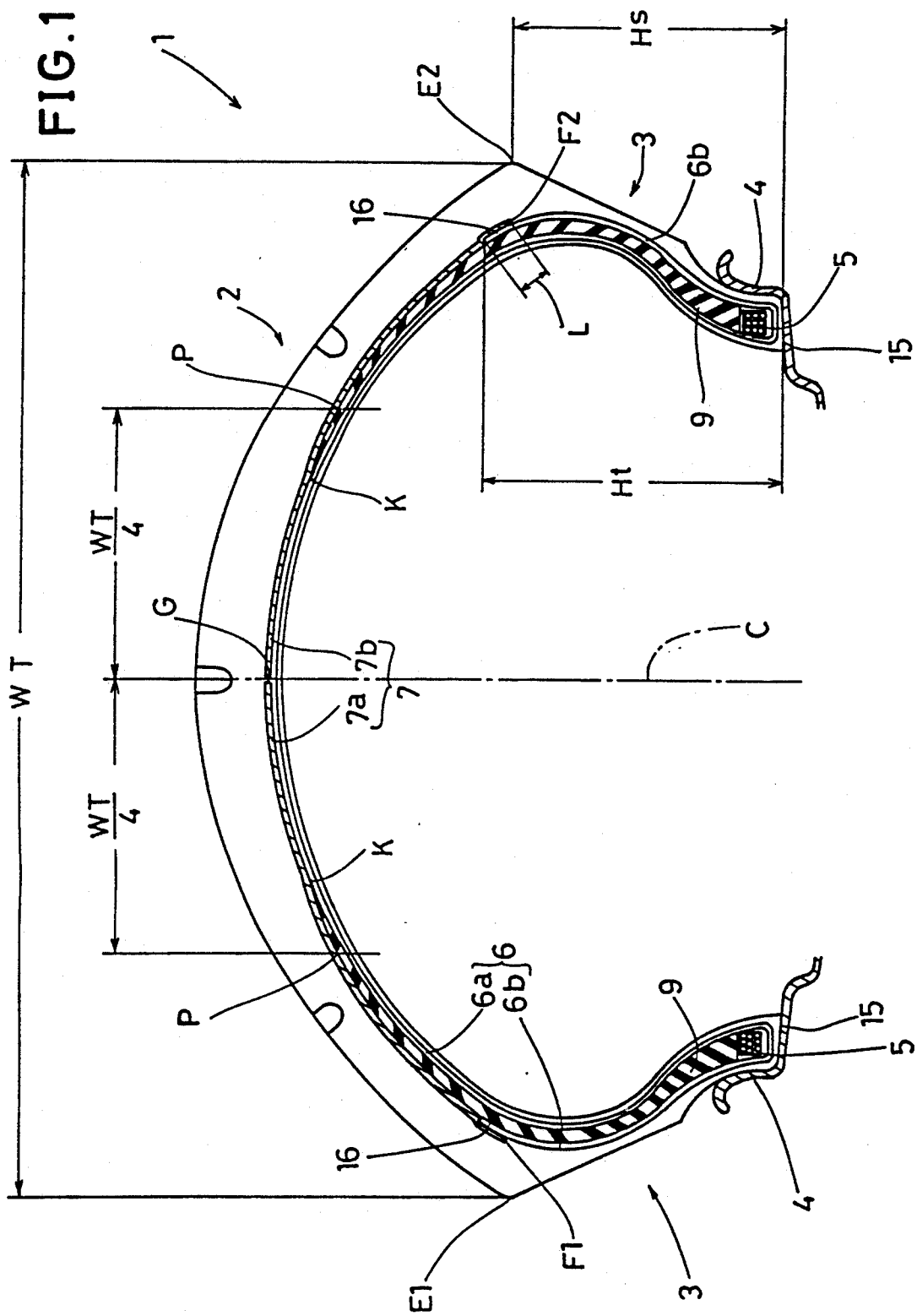
FIG. 1 is a sectional view showing an embodiment of the present invention.

In FIG. 1, motorcycle tire 1 has a tread portion, a pair of bead portions 4, and a pair of sidewall portions 3 extending radially inwardly of the tire from the edges of the tread portion to the bead portions.

The tread portion is curved so that the maximum cross sectional width of the tire lies between the tread edges E1 and E2, and the tread has an arched profile which is generally one third of a circle.

The tire 1 comprises:

a pair of bead cores 5 disposed one in each bead portion 4;

a carcass 6 extending between the bead portions 4 through the sidewall portions 3 and the tread portion 2, and having at least one ply of radially arranged cords turned up around the bead cores 5 from the axially inside to outside thereof to form two turned up portions 6b and a main portion 6a therebetween;

a tread 2 disposed radially outside the carcass to define the tread portion;

a belt 7 disposed radially outside the carcass 6 and inside the tread; and a bead apex 9 disposed between the carcass main portion 6a and each carcass turned up portion 6b and extending radially outwardly and taperingly from the bead core.

The carcass 6 has one ply of cords arranged radially at an angle of 85 to 90 degrees with respect to the tire equator C.

For the carcass cords, organic fiber cords, e.g. nylon, rayon, polyester, aromatic polyamide and the like can be used.

Each bead apex 9 is made of rubber having a JIS A hardness of 55 to 65, and extended from the radially outside of the bead core 5 into the tread portion along the outer face of the carcass main portion. The position of the radially outer edge K of the bead apex is radially outward and axially inward of the tread edge, and the axial distance thereof from the tire equator C is less than ¼ times the axial tread width WT.

Each carcass turned up portion 6b is extended radially outwardly to a position in the tread portion along the outer face of the bead apex, and the radial height Ht of the radially outer edge of the carcass turned up portion 6b is larger than the radial height Hs of the tread edge E1, E2 both measured from the bead base line 15. Further, the radially outer edge of the turned up portion is sandwiched between the belt edge portion and the bead apex. Preferably, the width L of the overlap 16 of the carcass turned up portion with the belt edge portion is set to be at least 10 mm. Therefore, separation failure from the carcass ply turned up edge is effectively suppressed, and the sidewalls are effectively reinforced, and thereby the durability of the tire is improved.

The belt 7 is composed of at least one spirally wound rubberized cord, and the belt width measured along the curved belt is preferably 0.7 to 1.0 times the tread width measured along the tread face.

In this embodiment, the belt 7 is composed of a two-piece ply 7 made up of a piece 7a and a piece 7b as shown in FIG. 1. Each ply piece is extended from a portion F1, F2 located near the tread edge E1, E2 to the tire equator. In each ply piece, at least one belt cord 11 is wound spirally and continuously from one edge to the other edge thereof at zero angle or a small angle with respect to the tire equator C.

For the belt cord 11, organic fiber cords, e.g. high-modulus polyester, aromatic polyamide, polyester and the like, or steel cords, having a high modulus of elasticity of not less than 600 kgf/sq.mm, are used.

When the elastic modulus is less than 600 kgf/sq.mm, the tread portion has an insufficient rigidity, and the directional stability and cornering performance at high speed are deteriorated.

Preferably, aromatic polyamide fiber cords whose twist is 20×20 to 57×57 (first twist×final twist (/10 cm)) are used because they have a high elastic modulus like a steel cord and a good adhesion to rubber.

Each of the belt pieces is formed by winding a ribbon 10 around the circumference of the carcass 6 (and the bead apex).

Figure 2:
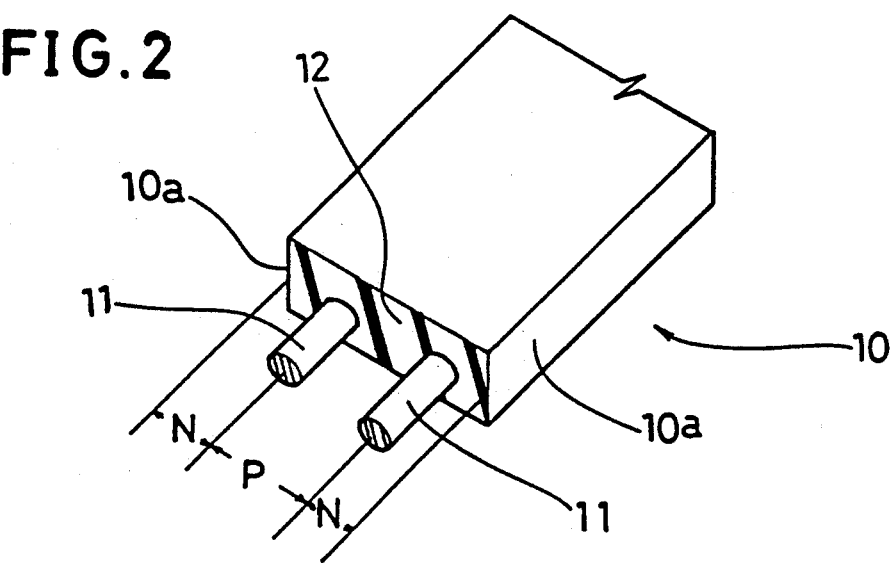
FIG. 2 is a perspective view showing a belt cord ribbon.

The ribbon 10 is, as shown in FIG. 2, a strip of rubber 12 in which a cord or a plurality of parallel cords, in this embodiment two parallel cords 11, are embedded.

In this embodiment, as shown in FIG. 2, the cross sectional shape of the ribbon 10 is a flat rectangle, and the distance N measured from the edge 10a of the ribbon to the center of the adjacent cord, that is, the outermost cord is set to be not more than ½ of the cord pitch P.

Figure 3:
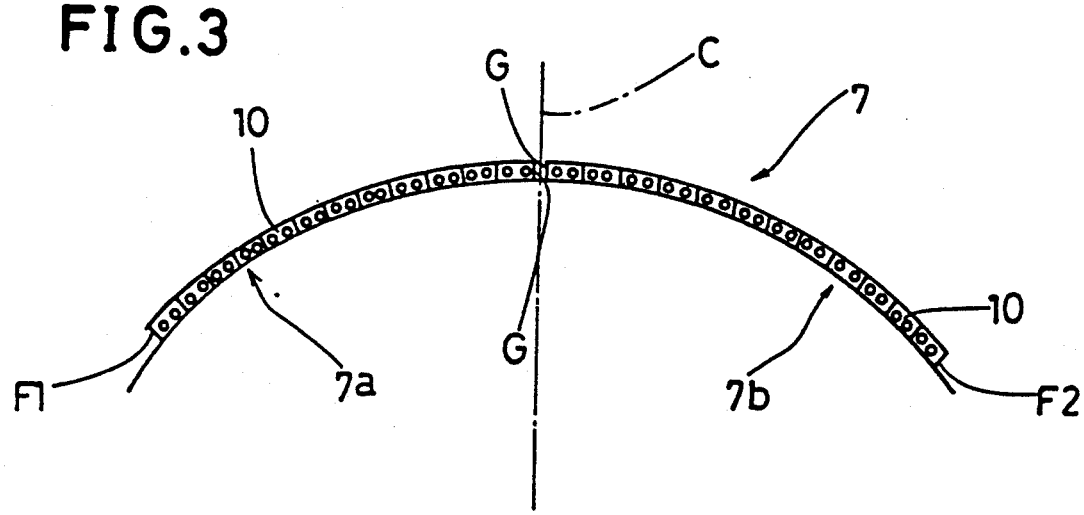
FIG. 3 is a sectional view showing winding of the ribbon.

As shown in FIG. 3, in order to make the above-mentioned two-piece ply, two ribbons 10 are simultaneously wound around a cylindrical face (which may be the outer face of the carcass and bead apexes applied to a tire making drum) from the respective axially outer edges F1 and F2 to the tire equator C. The ribbons to be wound are fed toward the cylindrical face from two different or opposite directions. Therefore, the ribbon in the ply piece 7a and the ribbon in the ply piece 7b are inclined in the same direction at the same small angle to the tire equator.

Preferably, the terminal ends G1 and G2 of the ribbons of the ply piece 7a and 7b are butt jointed at the tire equator and fixed by means of adhesive tape or adhesive agent.

Figure 4:
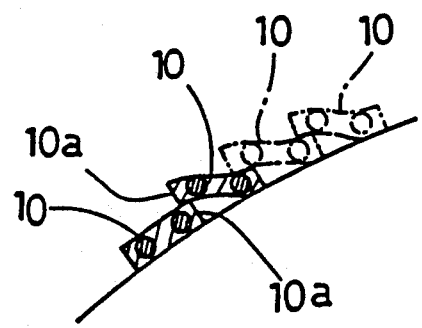
FIG. 4 is an enlarged view thereof.

When the ribbon 10 is being wound, the adjacent edges 10a can be overlapped as shown in FIG. 4. In this case, the wound portion is prevented from being loosened, which helps the prevention of belt edge separation during running.

By winding the two ribbons in this way, the belt has an asymmetrical structure with respect to the tire equator, in which the winding direction of the cords in one belt ply piece is same as that in the other piece.

However, the belt can have a symmetrical structure by supplying two ribbons from the same direction. Thus, the winding direction of the cords in one belt ply piece is differed from that in the other piece.

Incidentally, in each of the pieces and/or between the pieces, the inclination of the cords can be changed. Further, the belt 7 can be formed by winding a ribbon 10 spirally around the carcass continuously from one edge to the other edge. If an axial gap of not more than the cord pitch P is formed between the axially inner edges of the ply pieces 7a and 7b, the gap can remain as it is. However, to reinforce the joint part, such a gap can be covered by a reinforcing strip disposed over the joint part.

Test tires of size 170/60VR17 having a construction shown in FIG. 1 and specifications given in Table 1 were made and tested for high speed cornering stability and high speed straight running stability.

Figure 5:
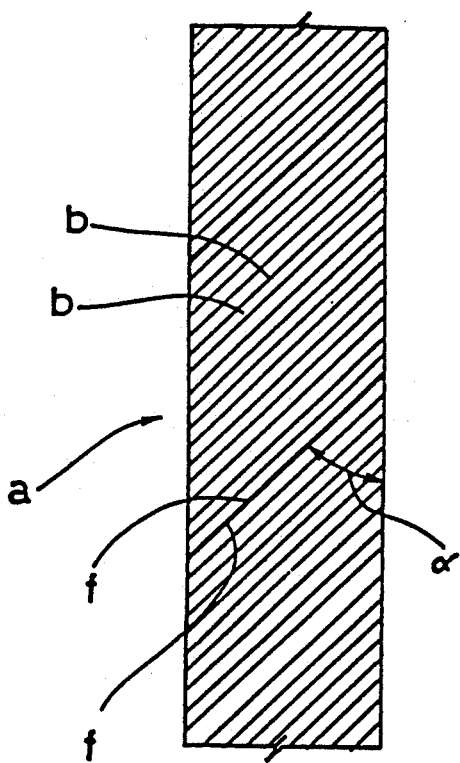
FIGS. 5 and 6 are plan views showing prior arts.
Figure 6:
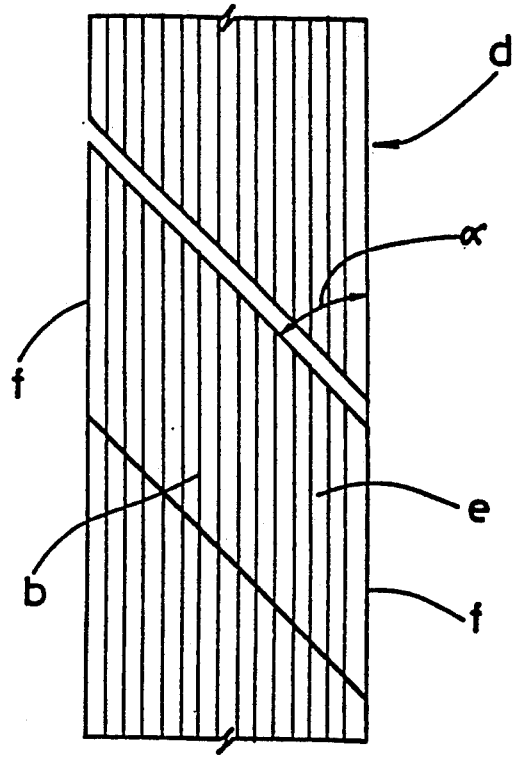

In the tests, each test tire was mounted on the rear wheel of a motorcycle of which front wheel is provided with a 120/70R17 tire having a conventional belt structure explained by FIGS. 5 and 6 (belt card angle to equator: 17 degrees), and the tire was run on a test road at 260 km/h (in a straight course) and 220 km/h (in a 400 m radius circular course). Then, using an index based on the assumption that the reference tire is 100, the stabilities were evaluated by rider's feeling. The larger the value, the better the performance.

TABLE 1

| Carcass | 1 ply | 2 plies | 1 ply |
| --- | --- | --- | --- |
| Cord material | nylon | nylon | nylon |
|  | 1260 d/2 | 840 d/2 | 840 d/2 |
| Cord angle (deg.) | 90 | 88 | 90 |
| Ht/Hs | 1.2 | 1.2 | 0.5 |
| Belt |  |  |  |
| Cord material | aramid | nylon | aramid |
|  | 1500 d/2 | 1500 d/3 | 1500 d/2 |
| Cord twist (/10 cm) | 35 | 35 | 37 |
| Bead apex |  |  |  |
| Distance of edge K | WT/4 | WT/4 | (Hs/2)* |
| JIS A hardness | 60 | 60 | 68 |
| Stability Test Result |  |  |  |
| Straight | 110 | 110 | 100 |
| Cornering | 105 | 110 | 100 |

*the radial height of the radially outer edge of the bead apex

As described above, in the motorcycle radial tire according to the present invention, the cornering power during straight running was decreased to effectively prevent weave phenomenon, and at the same time the camber thrust was effectively increased when the inclination of the tire was in the range of 20 to 40 degrees, and high speed cornering performance, e.g. road grip was improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A radial tire for motorcycles comprising:
a pair of bead cores disposed one in each bead portion of the tire;
a carcass extending between the bead portions and having at least one ply of organic fiber cords arranged radially at an angle of 85 to 90 degrees to the tire equator and turned up around the bead cores to form two turned up portions and a main portion therebetween;
a tread disposed radially outside the carcass and curved so that the maximum cross section width of the tire lies between the tread edges;
a belt disposed radially outside the carcass and inside the tread and having at least one spirally wound cord; and
a bead apex disposed between the carcass main portion and each carcass turned up portion,
said belt composed of at least one spirally wound cord having an elastic modulus of not less than 600 kgf/sq.mm,
said bead apex made of rubber having a JIS A hardness of 50 to 65 and extending radially outwardly from the bead core into the tread portion so that the extended portion is interposed between the belt and the carcass,
the axial distance of the radially outer edge of the bead apex from the tire equator being greater than zero and less than ¼ times the axial tread width,
each carcass turned up portion extending radially outwardly from the bead portion into the tread portion over the tread edge, and
the radial height of the radially outer edge of the turned up portion being larger than the radial height of the tread edge both being measured from the bead base.

2. The tire according to claim 1, wherein the radially outer edge of each turned up portion is secured between each edge portion of the belt and the bead apex.

3. The tire according to claim 1, wherein said at least one belt cord is made of aromatic polyamide fibers and the cord twist is 20×20 to 57×57 turns/10 cm.

4. The tire according to claim 1, wherein said belt comprises two pieces each made of at least one cord wound spirally from its one edge to the other edge.

* * * * *